(12) United States Patent
Abe et al.

(10) Patent No.: US 10,451,442 B2
(45) Date of Patent: Oct. 22, 2019

(54) STATOR STRUCTURE AND RESOLVER

(71) Applicant: MINEBEA MITSUMI INC., Nagano (JP)

(72) Inventors: Hiroshi Abe, Fukuroi (JP); Naohiro Yamada, Yokohama (JP); Mutsumi Matsuura, Tokyo (JP)

(73) Assignee: MINEBEA CO., LTD., Nagano (JP)

( * ) Notice: Subject to any disclaimer, the term of this patent is extended or adjusted under 35 U.S.C. 154(b) by 0 days.

(21) Appl. No.: 15/475,560

(22) Filed: Mar. 31, 2017

(65) Prior Publication Data

US 2017/0284833 A1    Oct. 5, 2017

(30) Foreign Application Priority Data

Apr. 5, 2016    (JP) .................................. 2016-176138
Mar. 27, 2017    (JP) .................................. 2017-061523

(51) Int. Cl.
| | | |
|---|---|---|
| *H02K 1/14* | (2006.01) | |
| *H02K 3/18* | (2006.01) | |
| *H02K 3/32* | (2006.01) | |
| *H02K 5/22* | (2006.01) | |
| *H02K 24/00* | (2006.01) | |
| *G01D 5/20* | (2006.01) | |

(52) U.S. Cl.
CPC ............. *G01D 5/2013* (2013.01); *G01D 5/20* (2013.01); *H02K 1/146* (2013.01); *H02K 3/18* (2013.01); *H02K 3/325* (2013.01); *H02K 5/225* (2013.01); *H02K 24/00* (2013.01)

(58) Field of Classification Search
CPC ........ G01D 5/2013; G01D 5/20; H02K 1/146; H02K 3/18; H02K 3/325; H02K 5/225; H02K 24/00
See application file for complete search history.

(56) References Cited

U.S. PATENT DOCUMENTS

| | | | |
|---|---|---|---|
| 2009/0324435 A1 | 12/2009 | Sears et al. | |
| 2015/0061652 A1* | 3/2015 | Otobe ................... | G01D 5/2046 324/207.17 |
| 2015/0097453 A1 | 4/2015 | Nishikawa et al. | |
| 2015/0288237 A1* | 10/2015 | Horng ...................... | H02K 5/10 310/89 |

(Continued)

FOREIGN PATENT DOCUMENTS

| | | |
|---|---|---|
| CN | 1499696 A | 5/2004 |
| CN | 204118971 U | 1/2015 |

(Continued)

OTHER PUBLICATIONS

Sep. 4, 2018 Office Action issued in Japanese Patent Application No. 2017-061523.

(Continued)

*Primary Examiner* — Jermele M Hollington
*Assistant Examiner* — Feba Pothen
(74) *Attorney, Agent, or Firm* — Oliff PLC

(57) ABSTRACT

A stator structure includes a stator core including a plurality of tooth sections, coils wound around the respective plurality of tooth sections via an insulator, and a first coil cover and a second coil cover that cover the coils from both sides in an axial direction of the stator core. The first coil cover and the second coil cover being coupled via the insulator.

10 Claims, 11 Drawing Sheets

(56) References Cited

U.S. PATENT DOCUMENTS

| | | | | |
|---|---|---|---|---|
| 2015/0345997 A1* | 12/2015 | Yamamoto | ............ | G01D 5/2073 |
| | | | | 324/207.17 |
| 2015/0372565 A1 | 12/2015 | Airoldi et al. | | |
| 2016/0043604 A1* | 2/2016 | Yoshida | ................ | H02K 3/325 |
| | | | | 310/71 |
| 2016/0377454 A1 | 12/2016 | Ochiai | | |
| 2017/0288518 A1 | 10/2017 | Matsuura et al. | | |

FOREIGN PATENT DOCUMENTS

| | | | |
|---|---|---|---|
| CN | 104969037 | A | 10/2015 |
| CN | 105186783 | A | 12/2015 |
| CN | 107276279 | A | 10/2017 |
| JP | 2004-135402 | A | 4/2004 |
| JP | 2009-148081 | A | 7/2009 |
| JP | 2014-070990 | A | 4/2014 |
| JP | 2015-045510 | A | 3/2015 |
| JP | 2015-076905 | A | 4/2015 |
| JP | 2016-050899 | A | 4/2016 |
| JP | 2017-009506 | A | 1/2017 |
| WO | 2014/095880 | A2 | 6/2014 |

OTHER PUBLICATIONS

Nov. 2, 2018 Office Action issued in Chinese Patent Application No. 201710211236.3.
Apr. 16, 2019 Decision to Grant issued in Japanese Patent Application No. 2017-061523.
Aug. 2, 2019 Office Action issued in Chinese Patent Application No. 201710211236.3.

* cited by examiner

STATOR STRUCTURE AND RESOLVER

CROSS REFERENCE TO RELATED APPLICATIONS

This application claims the benefit of Japanese Patent Application No. 2016-076138, filed Apr. 5, 2016, and Japanese Patent Application No. 2017-061523, filed Mar. 27, 2017, which are hereby incorporated by reference in their entirety.

BACKGROUND

Technical Field

The present disclosure relates to a stator structure and a resolver.

Background

A resolver is known as a rotation angle sensor. The resolver is comprised of a stator including a plurality of tooth sections radially extending from a ring-shaped stator core and a rotor disposed to be opposed to a tooth section of the stator. Stator winding wires are wound around the tooth sections via an insulator to form coils. The stator winding wire is comprised of an excitation winding wire for inputting an excitation signal and two detection winding wires for outputting two-phase signals according to a rotation angle of the rotor. A sine signal depending on sine and a cosine signal depending on core are respectively output from the detection winding wires. In the resolver, there is known a configuration in which two coil covers (protection covers) for covering the stator winding wires (the coils) are attached to both sides of the stator core in order to prevent foreign matter intrusion.

In the configuration, for example, a plurality of first column sections and a plurality of first receiving sections are provided in a first coil cover and a plurality of second column sections and a plurality of second receiving sections are provided in a second coil cover. The first column sections and the second column sections respectively extend to spaces (slots) among the tooth sections in which the insulator is provided. After the first coil cover and the second coil cover are attached to the stator core, ultrasonic vibration is applied to positions where the second receiving sections of the second coil cover are provided. The first column sections of the first coil cover and the second receiving sections of the second coil cover are welded to each other. Consequently, the first coil cover and the second coil cover are coupled to each other (see Japanese Patent Application Laid-Open No. 2009-148081).

However, in the configuration example, after the first coil cover and the second coil cover are attached to the stator core, the ultrasonic vibration is applied and the first column sections and the second receiving sections are welded to each other. Therefore, it is difficult to visually check a welded state of the first coil cover and the second coil cover. Consequently, it is likely that the coupling of the coil covers is insufficient and foreign matters intrude. It is likely that the reliability of the resolver deteriorates.

SUMMARY

The present disclosure is related to providing a stator structure and a resolver that can further improve reliability.

According to an aspect of the present disclosure, a stator structure includes a stator core including a plurality of tooth sections, coils wound around the respective plurality of tooth sections via an insulator and a first coil cover and a second coil cover that cover the coils from both sides in an axial direction of the stator core. The first coil cover and the second coil cover are coupled via the insulator.

According to the aspect of the present disclosure, it is possible to further improve reliability.

DETAILED DESCRIPTION

A stator structure and a resolver according to an embodiment are explained below with reference to the drawings.

Embodiment

Figure 1:
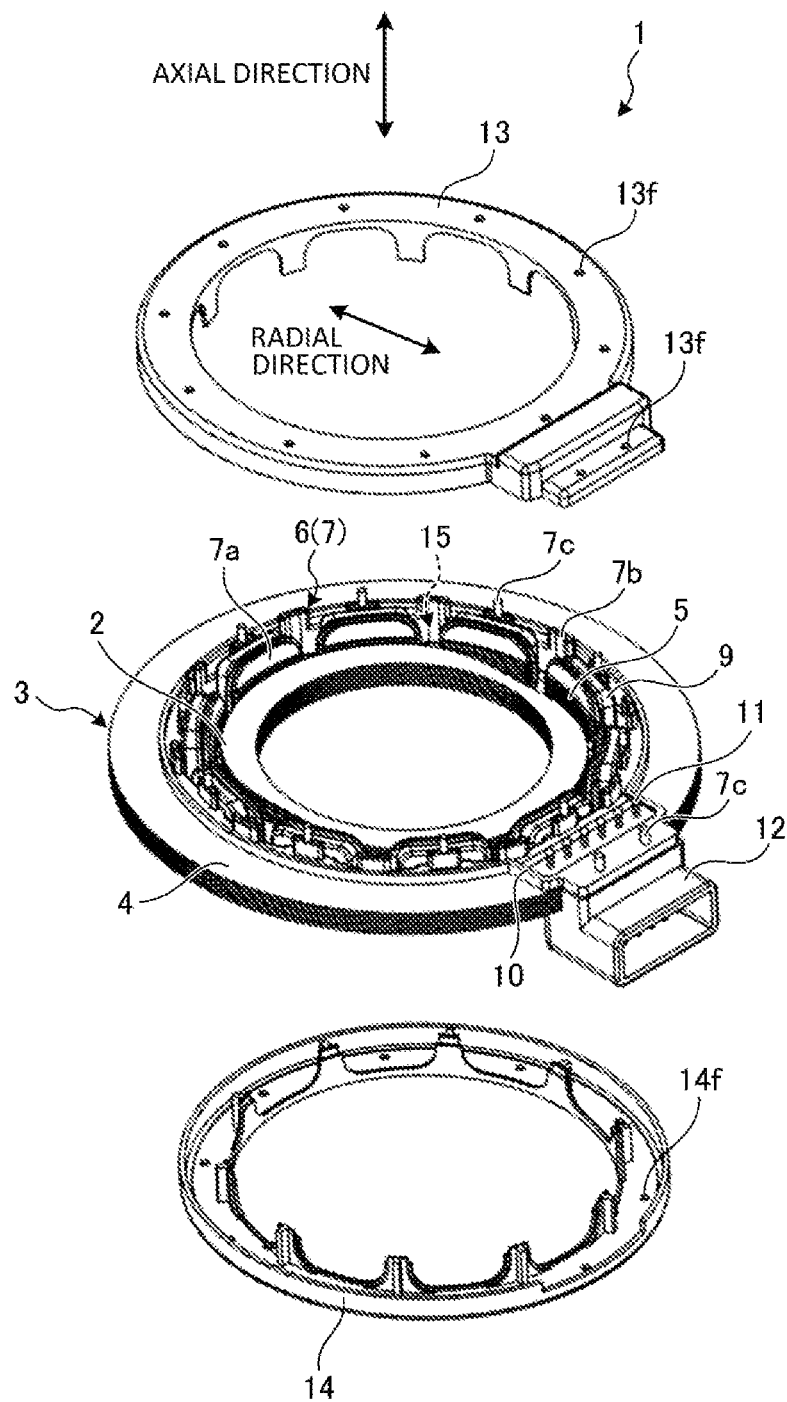
FIG. 1 is a schematic exploded perspective view of a resolver according to the present embodiment.

FIG. 1 is a schematic exploded perspective view of a resolver according to the present embodiment. As shown in FIG. 1, a resolver 1 according to the present embodiment is a VR (variable reluctance) type resolver including a rotor 2, a stator 3, a first coil cover 13, and a second coil cover 14. The stator 3, the first coil cover 13, and the second coil cover 14 configure a stator structure.

The rotor 2 has a stacked structure in which cores of steel plates made of a soft magnetic material such as silicon steel plates are stacked. The rotor 2 is attached to a rotating shaft of a not-shown motor and disposed on the inner side of the stator 3. An axial direction shown in FIG. 1 coincides with the axial direction of the rotating shaft of the motor connected to the rotor 2. As shown in FIG. 1, a radial direction coincides with a direction orthogonal to the axial direction. Note that the radial direction means all directions parallel to a surface orthogonal to the axial direction. However, in FIG. 1, one of radial directions is indicated by a line with arrows at both ends.

The stator 3 includes a stator core 4, coils 9, and an insulator 6. The stator core 4 is formed by stacking, in the axial direction, a predetermined number of cores of steel plates made of a soft magnetic material such as silicon steel plates. The stator core 4 includes a plurality of tooth sections 5 extending inward in the radial direction from an annular section. In the present embodiment, the stator core 4 includes ten tooth sections 5. However, the number of the tooth sections 5 is not particularly limited. The tooth sections 5 are disposed at an equal angle interval in the circumferential direction of the annular section. The distal ends of the tooth sections 5 include distal end portions expanding in the circumferential direction. The coils 9 are wound around the respective plurality of tooth sections 5 via the insulator 6. Spaces (slots 15) are formed between the tooth sections 5, respectively.

The insulator 6 is molded by the injection molding of insulating resin. The insulator 6 is formed by a first insulator 7 and a second insulator 8 that cover the plurality of tooth sections 5 from both sides in the axial direction of the stator core 4. Note that, in FIG. 1, as the insulator 6, the first insulator 7 attached from the upper side of the plurality of tooth sections 5 is shown. The second insulator 8 attached from the lower side of the plurality of tooth sections 5 is not shown.

The first insulator 7 includes a terminal block section 10 extending outward in the radial direction of the stator core 4. Terminals 11 (in FIG. 1, six terminals 11) are planted in the terminal block section 10. A female connector housing 12 is also formed in the terminal block section 10. The terminal block section 10 can be molded simultaneously with the first insulator 7. At one ends of the terminals 11, ends of winding wires forming the coils 9 corresponding to the terminals 11 are bound. Other ends of the terminals 11 project to the inside of the connector housing 12. The other ends of the terminals 11 are connected to external connectors. The first insulator 7 and the terminal block section 10 are integrally molded by the injection molding of insulating resin.

The first insulator 7 includes a plurality of arm sections (in FIG. 1, ten arm sections) extending inward in the radial direction from the annular section. Flange sections 7a are provided at the distal ends of the arm sections. The arm sections of the first insulator 7 are attached to the portions (upper side) of the tooth sections 5 of the stator core 4, respectively. The flange sections 7a prevent unwinding of the winding wires (the coils 9) wound around the arm sections. Connecting pins 7b that support connecting wires of the winding wires forming the coils 9 are integrally formed in bases (depths of the slots 15) among the arm sections adjacent to one another. In the present embodiment, ten connecting pins 7b are formed.

Resin pins 7c are integrally formed in the annular section in the bases of the arm sections of the first insulator 7. In FIG. 1, ten resin pins 7c are formed at an equal angle interval in the annular section of the first insulator 7. Further, in the terminal block section 10, two resin pins 7c are integrally formed on the outer circumference side of the terminals 11. That is, in the example shown in FIG. 1, twelve resin pins 7c in total are formed in the first insulator 7. The resin pins 7c are explained below.

As in the case of the first insulator 7, the second insulator 8 includes a plurality of arm sections (in the present embodiment, ten arm sections) extending inward in the radial direction from the annular section. Flange sections 8a are provided at the distal ends of the arm sections. The arm sections of the second insulator 8 are attached to the portions (lower side) of the tooth sections 5 of the stator core 4, respectively. The flange sections 8a prevent unwinding of the winding wires (the coils 9) wound around the arm sections. Resin pins 8c explained below are integrally formed in the annular section in the bases of the arm sections of the second insulator 8. In the present embodiment, ten resin pins 8c are formed at an equal angle interval in the annular section of the second insulator 8. In the present embodiment, when the first insulator 7 and the second insulator 8 are attached to the stator core 4, the ten resin pins 8c are formed in the second insulator 8 to be present in the same positions as the ten resin pins 7c.

Note that, in FIG. 1, the connecting pins 7b are formed in the first insulator 7. However, in the present embodiment, the connecting pins 7b may be formed in the second insulator 8. Positions where the resin pins 7c and the resin pins 8c are formed are not limited to the positions explained above. For example, the resin pins 7c may be formed on the connecting pins 7b. For example, if the connecting pins 7b are formed in the second insulator 8, the resin pins 8c may be formed on the connecting pins 7b. In this case, compared with the configuration in which the resin pins 7c and the resin pins 8c are formed in the bases of the arm sections, when the winding wires are wound around the arm sections, flexibility of a movement of a nozzle of a winding machine increases. If flexibility of the external dimension of the insulator 6 is high, the resin pins 7c may be formed further on the outer circumference side than the connecting pins 7b. The positions of the resin pins 7c are not particularly limited. In this case, when the winding wires are wound on the arm sections, the winding is not restricted by the movement of the nozzle of the winding machine.

In the example explained above, the insulator 6 is comprised of the first insulator 7 and the second insulator 8. In the present embodiment, the insulator 6 is integrally molded to the stator core 4 by insert molding. In the example explained above, the first insulator 7 and the terminal block section 10 are integrally molded by the injection molding. However, in the present embodiment, the terminal block section 10 formed of another member may be attached. In the present embodiment, the connector housing 12 may not be formed.

Figure 2:
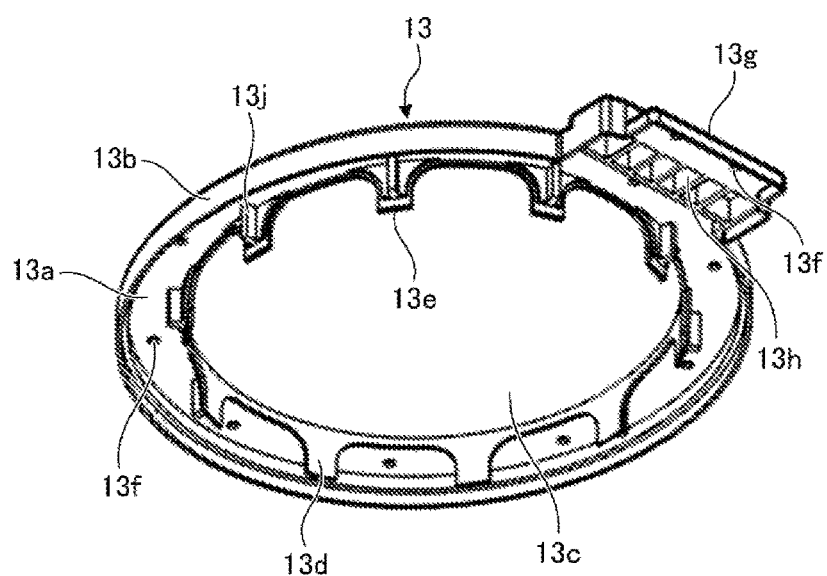
FIG. 2 is a perspective view of a first coil cover shown in FIG. 1.
Figure 3:
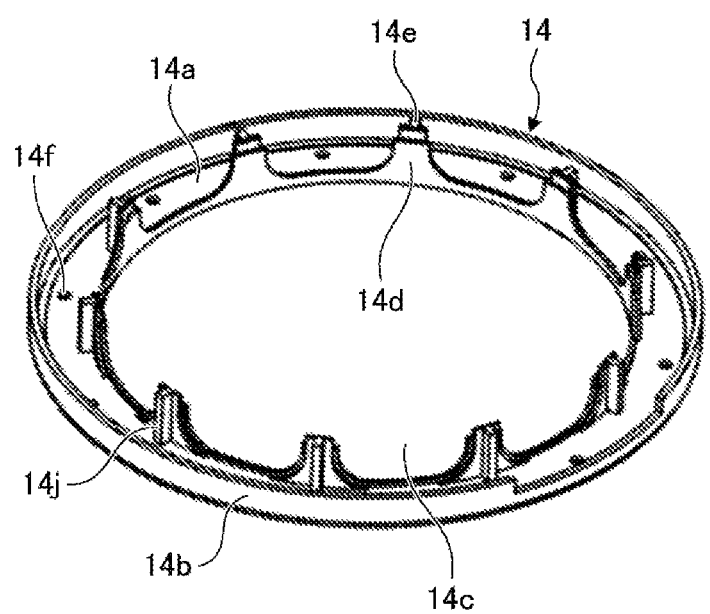
FIG. 3 is a perspective view of a second coil cover shown in FIG. 1.

The first coil cover 13 and the second coil cover 14 are explained with reference to FIGS. 2 and 3 together with FIG. 1. FIG. 2 is a perspective view of the first coil cover shown in FIG. 1. FIG. 3 is a perspective view of the second coil cover shown in FIG. 1.

A constituent material of the first coil cover 13 and the second coil cover 14 is not limited. However, in the present embodiment, the first coil cover 13 and the second coil cover 14 are made of resin and are molded, for example, by the injection molding of the resin. As the resin, for example, insulating resin can be used. The first coil cover 13 and the second coil cover 14 are coil covers that cover the coils 9 from both sides in the axial direction of the stator core 4 and protect the coils 9. As shown in FIG. 1, the first coil cover 13 is attached from the upper side of the coils 9. The second coil cover 14 is attached from the lower side of the coils 9.

As shown in FIG. 2, in the first coil cover 13, a ring section 13a forming a main body is annular as a whole. The ring section 13a includes, at the outer circumferential edge, an outer circumferential wall 13b extending in the axial direction. A terminal-block cover section 13g that covers the aforementioned terminal block section 10 is provided in a part of the outer circumferential wall 13b.

The terminal-block cover section 13g that covers the terminal block section 10 includes isolating members (partition plates) provided on the inside. The terminals 11 are respectively housed in spaces 13h, which are formed by the plurality of isolating members, to be separated from one another. With the configuration in which the terminals 11 are housed in the spaces 13h, it is possible to prevent the terminals 11 from being electrically short-circuited by foreign matters that intrude into the stator structure.

As shown in FIG. 3, in the second coil cover 14, a ring section 14a forming a main body is annular as a whole. The ring section 14a includes, at the outer circumferential edge, an outer circumferential wall 14b extending in the axial direction. The inner diameter and the outer diameter of the ring section 14a of the second coil cover 14 are respectively substantially the same as the inner diameter and the outer diameter of the ring section 13a of the first coil cover 13.

Referring to FIG. 2, in the ring section 13a of the first coil cover 13, through-holes 13f are formed at an equal pitch interval in the circumferential direction. Through-holes 13f are formed on the outer circumference side of the terminal-block cover section 13g. In the present embodiment, ten through-holes 13f are formed in the ring section 13a. Two through-holes 13f are formed in the terminal-block cover section 13g. The through-holes 13f of the ring section 13a are formed at a pitch equal to the pitch of the resin pins 7c formed in the annular section of the first insulator 7. The through-holes 13f of the terminal-block cover section 13g are formed at a pitch equal to the pitch of the resin pins 7c formed in the terminal block section 10.

As shown in FIG. 3, in the ring section 14a of the second coil cover 14, through-holes 14f are formed at an equal pitch interval in the circumferential direction. In the present embodiment, ten through-holes 14f are formed in the ring section 14a. The through-holes 14f of the ring section 14a are formed at a pitch equal to the pitch of the resin pins 8c formed in the annular section of the second insulator 8.

Referring to FIG. 2, at the circumferential edge of an opening 13c in the center of the first coil cover 13, protrusion sections 13d extending in the axial direction like the outer circumferential wall 13b are formed. Step sections 13e are formed at the distal ends of the protrusion sections 13d, respectively. In the present embodiment, ten protrusion sections 13d are formed at an equal pitch interval in the circumferential direction. The protrusion sections 13d gradually increase in width in the circumferential direction toward the ring section 13a side.

As shown in FIG. 3, at the circumferential edge of an opening 14c in the center of the second coil cover 14, protrusion sections 14d extending in the axial direction like the outer circumferential wall 14b are formed. Step sections 14e are formed at the distal ends of the protrusion sections 14d, respectively. In the present embodiment, ten protrusion sections 14d are formed at an equal pitch interval in the circumferential direction. The protrusion sections 14d gradually increase in width in the circumferential direction toward the ring section 14a side.

Referring to FIG. 2, ribs 13j are formed on the inner circumferential surfaces of the protrusion sections 13d. The ribs 13j are erected on the ring section 13a. The ribs 13j are integrally molded with the protrusion sections 13d. The ribs 13j extend in a direction substantially perpendicular to the inner circumferential surfaces of the protrusion sections 13d. As shown in FIG. 3, ribs 14j are formed on the inner circumferential surfaces of the protrusion sections 14d. The ribs 14j are erected on the ring section 14a. The ribs 14j are integrally molded with the protrusion sections 14d. The ribs 14j extend in a direction substantially perpendicular to the inner circumferential surfaces of the protrusion sections 14d. The ribs 13j reinforce the strength of the protrusion sections 13d. The ribs 14j reinforce the strength of the protrusion sections 14d.

The first coil cover 13 and the second coil cover 14 having the structures explained above are respectively attached from both sides in the axial direction of the stator core 4 to configure the stator structure. In the present embodiment, the first coil cover 13 and the second coil cover 14 are coupled via the insulator 6 to cover the stator core 4 from both the sides in the axial direction of the stator core 4.

Specifically, the first coil cover 13 is coupled to the first insulator 7. The second coil cover 14 is coupled to the second insulator 8. For example, the resin pins 7c formed in the first insulator 7 are inserted through the through-holes 13f formed in the first coil cover 13. The first coil cover 13 and the first insulator 7 are coupled via the resin pins 7c formed in the first insulator 7. For example, the resin pins 8c formed in the second insulator 8 are inserted through the through-holes 14f formed in the second coil cover 14. The second coil cover 14 and the second insulator 8 are coupled via the resin pins 8c formed in the second insulator 8.

Figure 4:
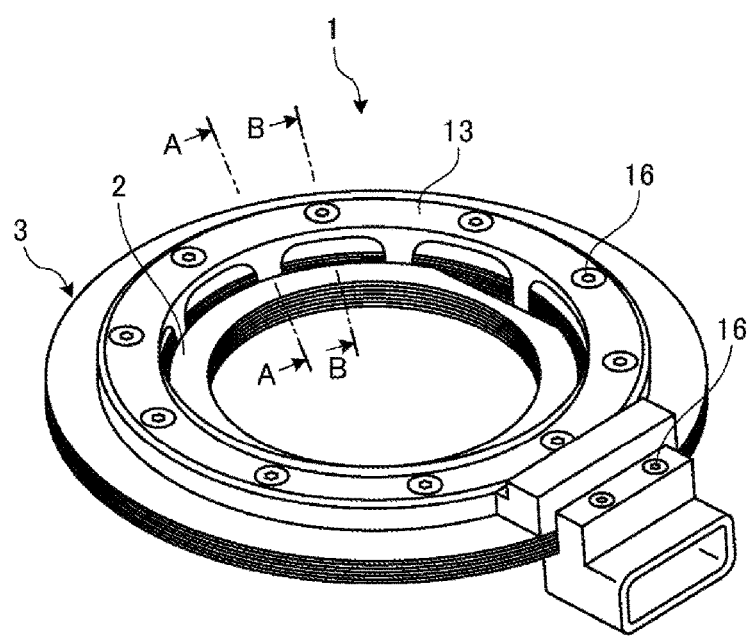
FIG. 4 is a top perspective view of a resolver in which the first coil cover and the second coil cover shown in FIG. 1 are attached to a stator core.
Figure 5:
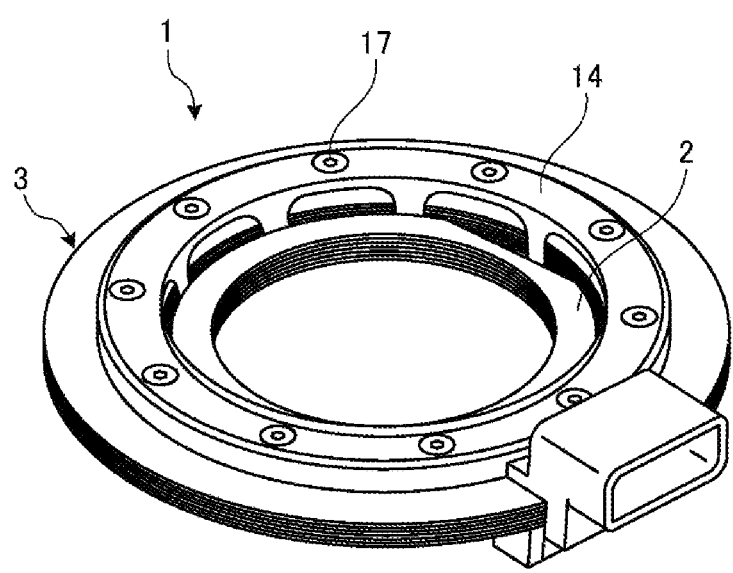
FIG. 5 is a bottom perspective view of the resolver shown in FIG. 4.
Figure 6:
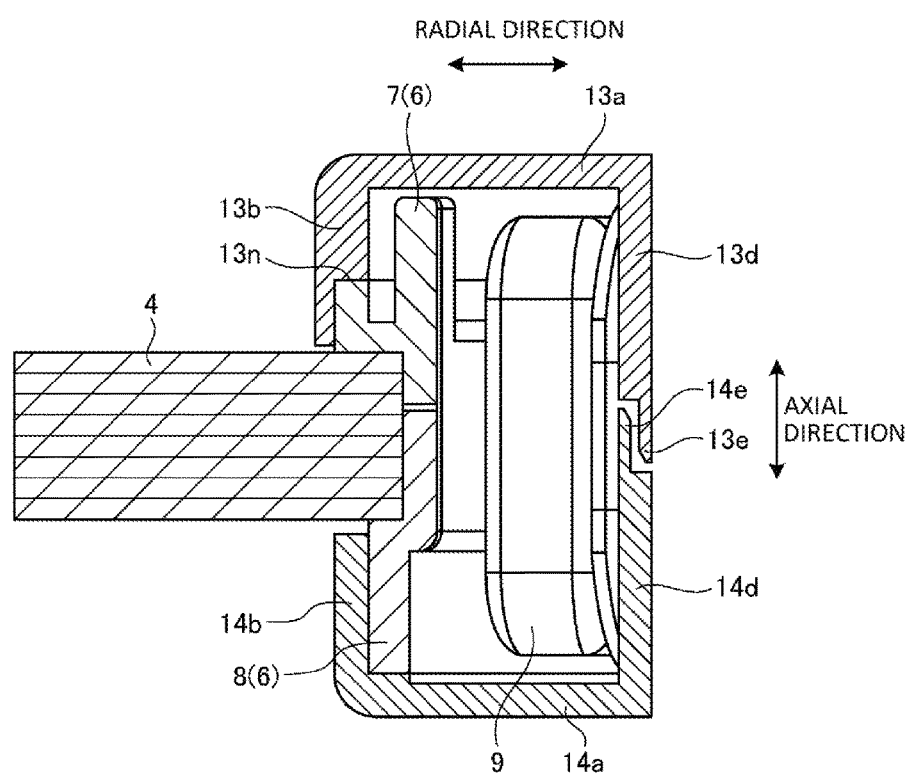
FIG. 6 is an A-A line main part sectional view of a state in which a rotor is detached from the resolver shown in FIG. 4.
Figure 7:
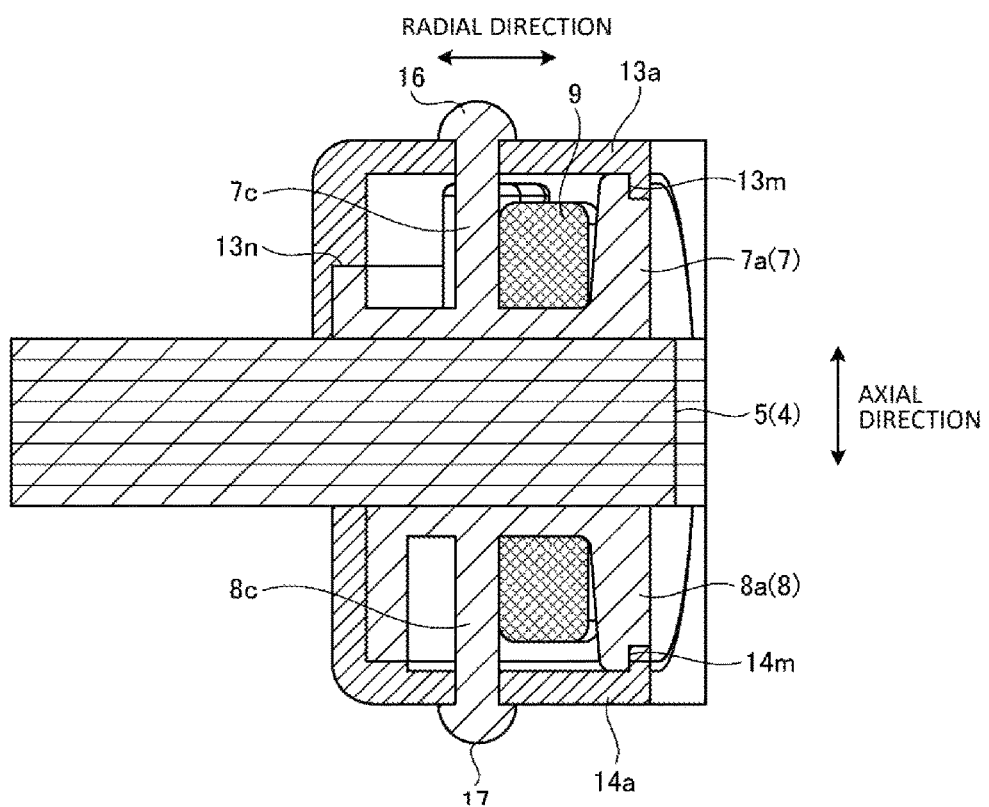
FIG. 7 is a B-B line main part sectional view of the state in which the rotor is detached from the resolver shown in FIG. 4.
Figure 8:
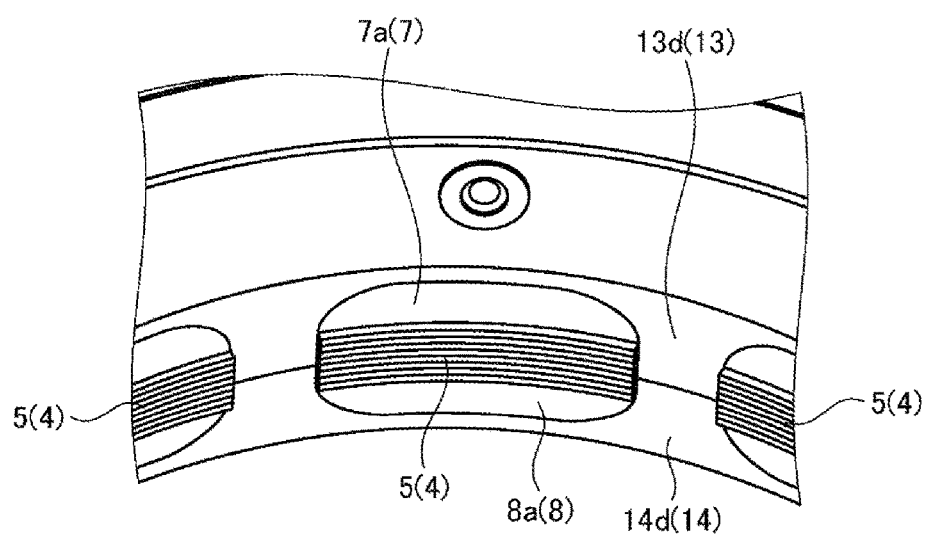
FIG. 8 is a diagram showing a state in which the first coil cover and the second coil cover are attached to a slot.

FIG. 4 is a top perspective view of the resolver 1 shown in FIG. 1 in which the first coil cover 13 and the second coil cover 14 are attached to the stator 3. FIG. 5 is a bottom perspective view of the resolver 1 shown in FIG. 4. FIG. 6 is an A-A line main part sectional view of a state in which the rotor 2 is detached from the resolver 1 shown in FIG. 4. FIG. 7 is a B-B line main part sectional view of the state in which the rotor 2 is detached from the resolver 1 shown in FIG. 4. FIG. 8 is a diagram showing a state in which the first coil cover 13 and the second coil cover 14 are attached to the slot 15.

The resin pins 8c formed in the second insulator 8 are inserted through the through-holes 14f formed in the second coil cover 14. Distal ends 17 of the resin pins 8c projecting from the through-holes 14f are crushed by infrared caulking or thermal caulking (see FIGS. 5 and 7). In the present embodiment, ten distal ends 17 are crushed by caulking. Consequently, the second coil cover 14 is coupled to the second insulator 8. The resin pins 7c formed in the first insulator 7 are inserted through the through-holes 13f formed in the first coil cover 13. Distal ends 16 of the resin pins 7c projecting from the through-holes 13f are crushed by infrared caulking or thermal caulking (see FIGS. 4 and 7). In the present embodiment, twelve distal ends 16 are crushed by caulking. Consequently, the first coil cover 13 is coupled to the first insulator 7.

The first coil cover 13 and the first insulator 7 are coupled by the plurality of resin pins 7c. The second coil cover 14 and the second insulator 8 are coupled by the plurality of resin pins 8c. Therefore, firm coupling strength can be obtained. The resin pins 7c (the distal ends 16) are caulked and fixed on the surface of the first coil cover 13. The resin pins 8c (the distal ends 17) are caulked and fixed on the surface of the second coil cover 14. Therefore, an exterior state of the caulking can be easily visually checked. Consequently, it is possible to further improve the reliability of the stator structure and the resolver 1.

As shown in FIG. 8, the plurality of protrusion sections 13d included in the first coil cover 13 and the plurality of protrusion sections 14d included in the second coil cover 14 are disposed in the spaces (the slots 15) between the distal ends of the plurality of tooth sections 5. The protrusion sections 13d and the protrusion sections 14d are respectively inserted into the slots 15 and disposed. As explained above with reference to FIGS. 2 and 3, the step sections 13e are formed at the distal ends of the protrusion sections 13d. The step sections 14e are formed at the distal ends of the protrusion sections 14d.

As shown in FIG. 6, each of the step sections 13*e* and each of the step sections 14*e* are formed to be steps opposed to each other. Consequently, the step section 13*e* and the step section 14*e* are disposed in a nesting state with each other and partially overlap a very small space apart from each other in the radial direction. Therefore, in the overlapping part, the slot 15 cannot be directly seen from the inner circumference side of the stator core 4. With such a disposition configuration of each of the step sections 13*e* and each of the step sections 14*e*, although the protrusion sections 13*d* and the protrusion sections 14*d* are respectively slightly separated from each other and have gaps, foreign matters less easily pass. As a result, it is possible to prevent or suppress intrusion of the foreign matters into the inside of the slots 15.

As shown in FIG. 7, steps 13*m* opposed to each other are formed in a joining part on the inner circumference side of the insulator 6 and the first coil cover 13, that is, a joining part of the flange section 7*a* and the first coil cover 13. Further, steps 14*m* opposed to each other are formed in a joining part on the inner circumference side of the insulator 6 and the second coil cover 14, that is, a joining part of the flange section 8*a* and the second coil cover 14. Therefore, the flange sections 7*a* and the first coil cover 13, and the flange sections 8*a* and the second coil cover 14 are joined with high adhesion. The slots 15 are closed by the protrusion sections 13*d* and the protrusion sections 14*d*. As a result, since the flange sections 7*a* and the flange sections 8*a* in the insulator 6 are joined with high adhesion to the first coil cover 13 and the second coil cover 14, foreign matters less easily pass around the flange section 7*a* and the flange section 8*a*. As a result, it is possible to suppress or prevent foreign matter intrusion into the inner side of the coil covers.

As shown in FIGS. 6 and 7, steps 13*n* opposed to each other are formed in a joining part on the outer circumference side of the insulator 6 and the first coil cover 13, that is, a joining part of the first insulator 7 and the outer circumferential wall 13*b*. The outer circumference of the first insulator 7 is joined to the first coil cover 13 with high adhesion in the parts of the steps 13*n*. Therefore, foreign matters less easily pass the outer circumference. As a result, it is possible to suppress or prevent intrusion of the foreign matter into the inner side of the first coil cover 13.

Figure 9:
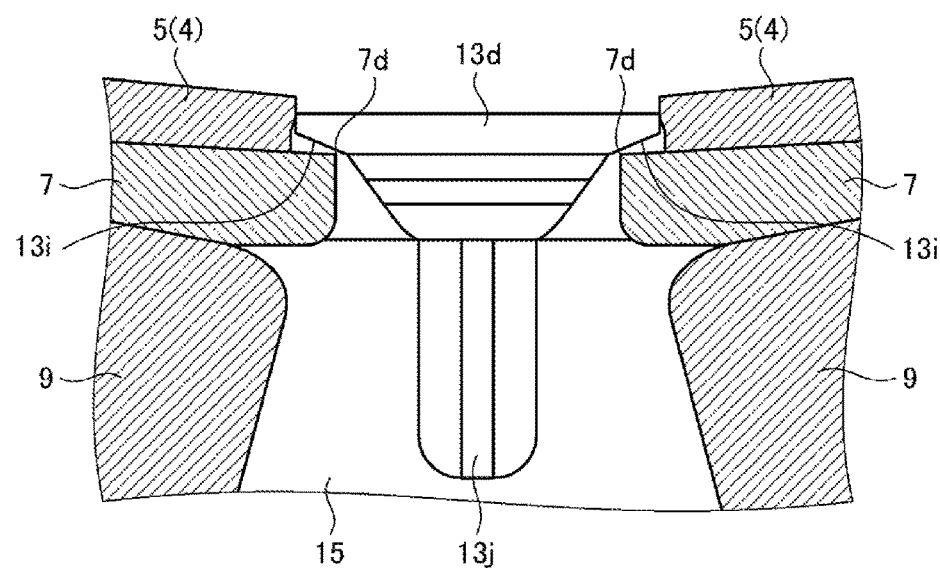
FIG. 9 is an enlarged view for explaining a state in which a protrusion section is disposed in the slot.

In order to suppress or prevent foreign matter intrusion, the stator structure according to the present embodiment further includes a configuration illustrated in FIG. 9. FIG. 9 is an enlarged view for explaining a state in which the protrusion sections 13*d* are disposed in the slots 15.

As shown in FIG. 9, an inclined section 13*i* (a taper section) is formed in a side of each of the protrusion sections 13*d*. A corner section 7*d* is formed in a side of the insulator 6 (the first insulator 7) opposed to the side of the protrusion section 13*d* in the circumferential direction. As shown in FIG. 9, the side of the protrusion section 13*d* and the side of the first insulator 7 are disposed to be in line contact along the axial direction. Since the corner section 7*d* and the inclined section 13*i* are configured to be in line contact along the axial direction, foreign matters less easily pass. As a result, it is possible to suppress or prevent the foreign matters from intruding into the slot 15. Note that, in the present embodiment, between the side of the protrusion section 13*d* and the side of the first insulator 7, an intrusion path into the slot 15 is not linearly formed even if a gap is slightly formed. Therefore, foreign mattes less easily pass. As a result, it is possible to suppress or prevent foreign matter intrusion into the slots 15. The configuration shown in FIG. 9 is the same in a relation between a side of the protrusion section 14*d* of the second coil cover 14 and a side of the second insulator 8.

Figure 10:
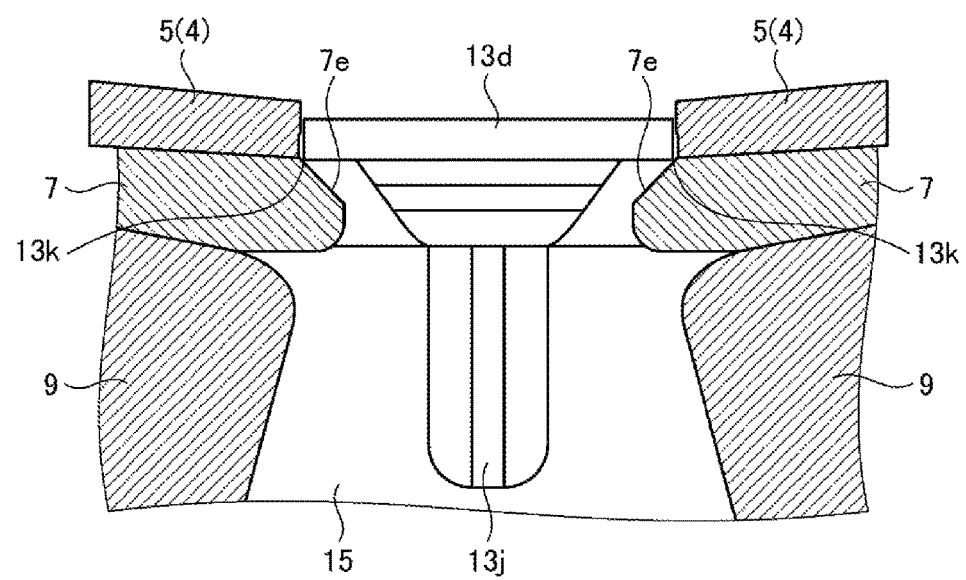
FIG. 10 is a diagram for explaining a first modification of the protrusion section.
Figure 11:
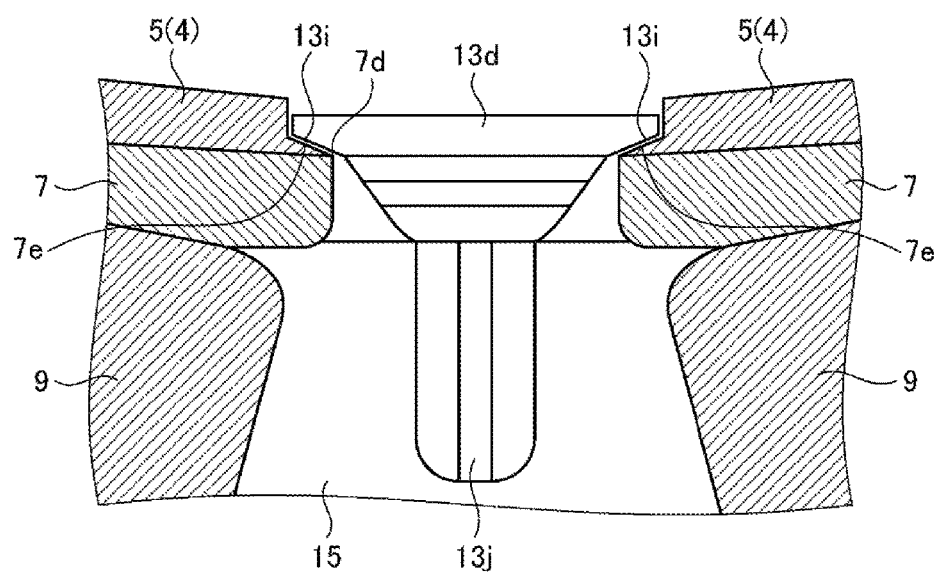
FIG. 11 is a diagram for explaining a second modification of the protrusion section.

Note that the relation between the side of the protrusion sections 13*d* and the side of the first insulator 7 is not limited to the relation shown in FIG. 9. FIG. 10 is a diagram for explaining a first modification of the protrusion sections 13*d*. FIG. 11 is a diagram for explaining a second modification of the protrusion sections 13*d*.

In the first modification shown in FIG. 10, a corner section 13*k* is formed in a side of each of the protrusion sections 13*d*. An inclined section 7*e* (a taper section) is formed in a side of the insulator 6 (the first insulator 7). The corner section 13*k* and the inclined section 7*e* may be configured such that a slight gap is formed or may be set in contact with each other (i.e., the corner section 13*k* and the inclined section 7*e* may be configured to be in line contact along the axial direction).

In the second modification shown in FIG. 11, the inclined section 13*i* (the taper section) is formed in a side of each of the protrusion section 13*d*. The inclined section 7*e* (the taper section) is formed in a side of the insulator 6 (the first insulator 7). The inclined section 13*i* and the inclined section 7*e* are opposed to each other to form a slight gap. In the configuration illustrated in FIG. 10 and in the configuration illustrated in FIG. 11, an effect same as the effect of the configuration illustrated in FIG. 9 is achieved.

In the present embodiment, the relation between the side of the protrusion section 13*d* and the side of the first insulator 7 and the relation between the side of the protrusion section 14*d* and the side of the second insulator 8 may be different relations as long as the relations are the relation shown in any one of FIGS. 9 to 11. For example, it is also possible that the inclined section 13*i* is formed in the side of the protrusion section 13*d* and the corner section 7*d* is formed on the side of the first insulator 7 and, on the other hand, a corner section is formed in the side of the protrusion section 14*d* and an inclined section is formed in the side of the second insulator 8. In this case, it is also possible to suppress or prevent foreign matter intrusion into the slot 15.

The winding wires forming the coils 9 and the terminal block section 10 are covered by the attachment of the first coil cover 13 and the second coil cover 14. As a result, since the winding wires and the terminal block section 10 are not exposed, it is possible to suppress or prevent damage to the coils 9 and the terminals 11. Since the slots 15 among the tooth sections 5 are closed by the protrusion sections 13*d* and the protrusion sections 14*d*, it is possible to suppress or prevent intrusion of foreign matters into the slots 15. The strength of the protrusion sections 13*d* and the protrusion sections 14*d* is improved by the ribs 13*j* and the ribs 14*j*. The reliability of the first coil cover 13 and the second coil cover 14 is improved.

Note that, in the above explanation, the resolver 1 is the inner rotor type. However, the present embodiment is also applicable to a resolver of an outer rotor type in which tooth sections extend from radially outward part of an annular section and a stator core is disposed on the inner side of a rotor.

The number of resin pins and formation positions of the resin pins are not limited to the number and the formation positions in the embodiment as long as the resin pins have coupling strength enough for securing reliability.

The present disclosure is not limited by the embodiment explained above. Those formed by combining the components as appropriate are also included in the present disclosure. Further effects and modifications can be easily derived by those skilled in the art. Therefore, wider aspects of the present disclosure are not limited to those in the embodiment described above. Various changes are possible.

What is claimed is:

1. A stator structure comprising:
a stator core including a plurality of tooth sections;
a plurality of coils wound around the respective plurality of tooth sections via an insulator; and
a first coil cover and a second coil cover covering the plurality of coils in an axial direction of the stator core by attaching the first coil cover and the second coil cover to both sides of the stator core via the insulator in the axial direction, the first coil cover and the second coil cover respectively including protrusion sections disposed in spaces among distal ends of the plurality of tooth sections, and step sections forming steps opposed to each other are formed at distal ends of the protrusion sections of the first coil cover and distal ends of the protrusion sections of the second coil cover, wherein:
a side of each of the protrusion sections is disposed to be in contact with or separated from a side of the insulator opposed to the side of each of the protrusion sections in a circumferential direction,
an inclined section is formed in one of the side of each protrusion section and the side of the insulator, and
a corner section is formed in another of the side of each protrusion section and the side of the insulator.

2. The stator structure according to claim 1, wherein the insulator includes a first insulator and a second insulator that cover the plurality of tooth sections from both the sides in the axial direction of the stator core, the first coil cover is coupled to the first insulator, and the second coil cover is coupled to the second insulator.

3. The stator structure according to claim 2, further comprising:
a plurality of pins formed in the first insulator that are inserted through holes formed in the first coil cover, the first coil cover and the first insulator being coupled via the plurality of pins formed in the first insulator, and
a plurality of pins formed in the second insulator that are inserted through holes formed in the second coil cover, the second coil cover and the second insulator being coupled via the pins formed in the second insulator.

4. The stator structure according to claim 1, further comprising a plurality of ribs respectively formed on inner circumferential surfaces of the protrusion sections of the first coil cover and inner circumferential surfaces of the protrusion sections of the second coil cover.

5. The stator structure according to claim 1, wherein steps opposed to each other are formed in a joining part on an inner circumference side of the insulator and the first coil cover, and a joining part on the inner circumference side of the insulator and the second coil cover.

6. The stator structure according to claim 1, wherein steps opposed to each other are formed in a joining part on an outer circumference side of the insulator and the first coil cover.

7. The stator structure according to claim 2, further comprising:
a terminal block section extending outward in a radial direction of the stator core from the first insulator;
a plurality of terminals provided in the terminal block section, ends of winding wires configuring the coils being bound to the terminals; and
a terminal-block cover section provided in the first coil cover to cover the terminal block section, the terminal-block cover section including a plurality of isolating members provided on an inside, the respective plurality of terminals are housed to be separated from one another in a respective plurality of spaces formed by the plurality of isolating members.

8. The stator structure according to claim 1, wherein the insulator is an integrally molded product.

9. A resolver comprising:
a rotor; and
the stator structure according to claim 1.

10. A stator structure comprising:
a stator core including a plurality of tooth sections;
a plurality of coils wound around the respective plurality of tooth sections via an insulator; and
a first coil cover and a second coil cover covering the plurality of coils in an axial direction of the stator core by attaching the first coil cover and the second coil cover to both sides of the stator core via the insulator in the axial direction, the first coil cover and the second coil cover respectively including protrusion sections disposed in spaces among distal ends of the plurality of tooth sections, and step sections forming steps opposed to each other are formed at distal ends of the protrusion sections of the first coil cover and distal ends of the protrusion sections of the second coil cover, wherein:
a side of each of the protrusion sections is disposed to be separated from a side of the insulator opposed to the side of each of the protrusion sections in a circumferential direction, and
opposed inclined sections are formed in the side of each protrusion section and the side of the insulator.

* * * * *